(12) United States Patent
Kawase et al.

(10) Patent No.: US 8,092,085 B2
(45) Date of Patent: Jan. 10, 2012

(54) TEMPERATURE SENSOR WITH LEADS

(75) Inventors: Masahiko Kawase, Omihachiman (JP); Shiro Tsuji, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 166 days.

(21) Appl. No.: 12/553,183

(22) Filed: Sep. 3, 2009

(65) Prior Publication Data

US 2009/0316752 A1    Dec. 24, 2009

Related U.S. Application Data

(63) Continuation of application No. PCT/JP2008/061048, filed on Jun. 17, 2008.

(30) Foreign Application Priority Data

Jun. 19, 2007   (JP) .................................. 2007-161626

(51) Int. Cl.
*G01K 7/00* (2006.01)
(52) U.S. Cl. ....................................... 374/185; 374/183
(58) Field of Classification Search ................... 374/183, 374/185
See application file for complete search history.

(56) References Cited

FOREIGN PATENT DOCUMENTS

| JP | 08-005468 A | 1/1996 |
| JP | 09-297069 A | 11/1997 |
| JP | 10-149903 A | 6/1998 |
| JP | 11-108771 A | 4/1999 |

OTHER PUBLICATIONS

Official Communication issued in International Patent Application No. PCT/JP2008/061048, mailed on Sep. 22, 2008.

*Primary Examiner* — Gail Verbitsky
*Assistant Examiner* — Mirellys Jagan
(74) *Attorney, Agent, or Firm* — Keating & Bennet, LLP

(57) ABSTRACT

A thermistor includes a thermistor body and terminal electrodes disposed at both ends of the thermistor body. A first lead is longer than a second lead. The first and second leads include tips having inclined shapes that are cut such that metal lines are surface-exposed, respectively. The thermistor body is attached at a predetermined side position of the first lead such that the first lead and a side folding portion of the terminal electrode form a predetermined angle θ. The terminal electrode and the first lead are connected to each other through solder, and the second lead and the terminal electrode are connected to each other through solder. This can prevent the occurrence of damage even if an excessive thermal stress is applied. The temperature sensor with leads having stable electric connection with the temperature sensor that has satisfactory detection sensitivity and high reliability is achieved.

8 Claims, 20 Drawing Sheets

TEMPERATURE SENSOR WITH LEADS

BACKGROUND OF THE INVENTION

1. Field of the Invention

The present invention relates to a temperature sensor with leads, and more specifically, to a temperature sensor with leads suited for measuring a temperature at a location remote from a control board on which a temperature sensor is mounted.

2. Description of the Related Art

A personal computer or a power assisted bicycle may use a relatively large secondary battery or a plurality of fuel cells arranged in parallel in some cases. In such cases, because a location where a temperature of a secondary battery or fuel cells is to be measured is remote from a control board on which a temperature sensor is mounted, a temperature sensor with leads utilizing a long lead is employed. The use of such a temperature sensor with leads enables the leads to be fixed on the control board (e.g., a printed circuit) by soldering and also allows a temperature sensing portion of the temperature sensor to be arranged adjacent to a part whose temperature is to be measured. Therefore, the temperature of the location where the temperature is to be measured can be detected with high precision.

One example of this type of a temperature sensor with leads is illustrated in FIG. 21 (Japanese Unexamined Patent Application Publication No. 10-149903). The temperature sensor includes a single plate thermistor 103 having a plate thermistor body 101 having both surfaces on which electrode layers 102a and 102b are formed. The thermistor 103 is sandwiched between leads 105a and 105b each having a tip to which a heat-resistant conductive paste 104 containing a glass frit is applied. An insulating inorganic substance layer 106 is formed on the surface of the thermistor element 101. These components are disposed in a glass tube 107 such that the connection part is covered. The electrodes are baked, and the components are simultaneously glass-sealed.

Another related-art example is illustrated in FIG. 22 (Japanese Unexamined Patent Application Publication No. 11-108771). This temperature sensor includes a pair of leads 112a and 112b drawn out of a thermistor 111, and the lead 112a is U-shaped. The thermistor 111 and insulated leads 113a and 113b arranged substantially in parallel are connected through solder 114a and 114b. The thermistor 111, the solder 114a and 114b, and the tip of each of the insulated leads 113a and 113b are housed in a heat-shrinkable insulator 115 made of, for example, polyolefin resin.

The temperature sensor described in Japanese Unexamined Patent Application Publication No. 11-108771 is designed to have a fixed gap (e.g., approximately 5 mm to 10 mm) in the longitudinal direction between the solder 114a and 114b such that they are not in contact with each other.

When the structure in which the plate thermistor 103 is sandwiched between the pair of leads 105a and 105b is used, as in Japanese Unexamined Patent Application Publication No. 10-149903, if an excessive thermal stress is applied, the insulating member coating each of the metal lines is thermally expanded, and additionally, a stress is produced in a direction in which the gap between the leads 105a and 105b broadens by the difference in thermal expansion between the leads 105a and 105b and the glass tube. That is, if an excessive thermal stress is applied, a stress occurs in the leads 105a and 105b in a direction in which the gap therebetween extends outwardly, as indicated by the arrows "a." Because of this, a mechanical stress occurs in the electrode layers 102a and 102b in a direction in which they become separated from the thermistor body 101, as indicated by the arrows "b." The glass tube may be broken.

In particular, if the leads 105a and 105b have different lengths or if there is a temperature difference between the leads 105a and 105b, because the amount of thermal expansion is also different, the stress indicated by the arrows b occurs.

As a result, a part of the electrode layers 102a and 102b may become separated from the thermistor body 101, this may increase the value of resistance, and thus a problem arises in which a measurement error is present between a measured temperature and an actual one. The stress indicated by the arrows a and b caused by an excessive thermal stress may break the thermistor body 101 itself, and the breakage may result in reduced reliability.

Additionally, because the thermistor 103 is sandwiched between the leads 105a and 105b, the dimension in the width direction is restricted by the thickness of the thermistor. This reduces the distance between the electrodes and increases the risk of a short circuit. Accordingly, there is also a problem in which it is difficult to further reduce the size.

In the temperature sensor described in Japanese Unexamined Patent Application Publication No. 11-108771, because the thermistor 111 is arranged such that the longitudinal direction of the thermistor 111 and the insulated lead 113b are parallel with each other, it can be considered that almost no stress occurs in a direction in which the electrodes become separated.

However, for the temperature sensor described in Japanese Unexamined Patent Application Publication No. 11-108771, although the solder 114a and solder 114b is designed to have a fixed gap in the longitudinal direction such that they are not in contact with each other, because of the structure in which the leads 112a and 112b are arranged in parallel in the longitudinal direction of the thermistor 111, an externally applied shock may separate the solder 114a and solder 114b. In addition, a stress is likely to be focused on the connection part between the leads 112a and 112b and the thermistor 111, so electric connection may be unstable. Because of this, for the temperature sensor described in Japanese Unexamined Patent Application Publication No. 11-108771, it is essential to cover the thermistor 111 and the leads 112a and 112b with the heat-shrinkable insulator 115. That is, for the type of the temperature sensor described in Japanese Unexamined Patent Application Publication No. 11-108771, it is necessary to cover a spatially large area extending from the thermistor 111 to the leads 112a and 112b with the heat-shrinkable insulator 115.

However, because the insulating resin forming the heat-shrinkable insulator 115 has low thermal conductivity, if the heat-shrinkable insulator 115 covers that area, the detection sensitivity is lower than that occurring when the heat-shrinkable insulator 115 is not provided.

SUMMARY OF THE INVENTION

In view of the above, preferred embodiments of the present invention provide a temperature sensor with leads having stable electric connection with the temperature sensor, the temperature sensor being capable of avoiding the occurrence of damage even if an excessive thermal stress is applied and having favorable detection sensitivity and high reliability.

A temperature sensor with leads according to a preferred embodiment of the present invention includes a temperature sensor including a sensor body and first and second leads each including a metal line. The temperature sensor includes first and second terminal electrodes disposed at both ends of the sensor body. The metal line is covered with an insulating member. The first and second leads are electrically connected to the first and second terminal electrodes, respectively. The metal line of each of the first and second leads is surface-exposed. At least the first lead includes a tip having a shape that is cut such that the tip and a side folding portion of the first terminal electrode connected to the first lead form a predetermined angle. The first lead is connected to the first terminal electrode through solder, and the second lead is connected to the second terminal electrode through solder.

In the temperature sensor with leads according to a preferred embodiment of the present invention, the first lead may be longer than the second lead. The first terminal electrode and the first lead may be connected to each other through the solder such that the sensor body is attached to the first lead along a longitudinal direction of the sensor body. The tip of the first lead may have any one of an inclined shape, a curved shape, an L shape, a stepped shape, an acute shape, and any combination thereof, for example.

In the temperature sensor with leads according to a preferred embodiment of the present invention, the second lead may include a tip having a shape that is cut such that the tip and an end surface portion of the second terminal electrode form a predetermined angle.

In the temperature sensor with leads according to a preferred embodiment of the present invention, the tip of the second lead may have any one of an inclined shape, a curved shape, an L shape, a stepped shape, an acute shape, and any combination thereof, for example.

In the temperature sensor with leads according to a preferred embodiment of the present invention, the first lead and the second lead may have the same or substantially the same length. The second lead may include a tip having a shape that is cut such that the tip and a side folding portion of the second terminal electrode form a predetermined angle.

In the temperature sensor with leads according to a preferred embodiment of the present invention, the temperature sensor may be a surface-mount thermistor.

In the temperature sensor with leads according to a preferred embodiment of the present invention, the surface-mount thermistor may include an internal electrode.

In the temperature sensor with leads according to a preferred embodiment of the present invention, the surface-mount thermistor may include a surface covered with a glass layer.

In the temperature sensor with leads according to a preferred embodiment of the present invention, the first lead and the second lead may be connected integrally in a longitudinal direction and may form a parallel lead set.

According to the above temperature sensor with leads, the metal line of each of the first and second leads is surface-exposed, at least the first lead includes a tip having a shape that is cut such that the tip and the side folding portion of the first terminal electrode connected to the first lead form a predetermined angle, and the first lead is connected to the first terminal electrode through solder. Accordingly, a gap or recess is present between the first lead and the first terminal electrode. Applying solder in the gap and melting the solder enables the temperature sensor to naturally move to a stable position and be fixed without a break in the solder.

At the cut section of the lead, the metal line is surface-exposed. Accordingly, applying solder to the cut section can ensure conduction.

Therefore, sufficient conductivity can be ensured without having to cover the exterior of the temperature sensor with an insulating member. Even if a mechanical stress is applied during the solidification of the solder, a temperature sensor with leads that is capable of being set to rest stably at a predetermined position and that has high sensitivity and high reliability can be achieved at low cost.

The first lead is longer than the second lead. The first terminal electrode is connected to the first lead through solder such that the sensor body is attached to the first lead along a longitudinal direction of the sensor body, and the tip of the first lead has any one of an inclined shape, a curved shape, an L shape, a stepped shape, an acute shape, and any combination thereof, for example. Accordingly, the temperature sensor can be supported by the first lead such that the corner from the end surface of the terminal electrode to the side folding portion is covered. Therefore, a stress is vertically applied to the connection portion between the first lead and the temperature sensor. This can prevent the occurrence of separation of the terminal electrodes from the sensor body or a damage to the sensor body even if an external thermal stress or a mechanical stress is applied to the solder.

In addition, because the second lead includes a tip having a shape that is cut such that the tip and an end surface portion of the second terminal electrode form a predetermined angle, a surface tension acts in solder present between the second lead and the second terminal electrode in a direction in which the stable shape is maintained. Therefore, the second terminal electrode is not excessively pulled toward the second lead, and the temperature sensor is fixed strongly at a predetermined stable position.

Even when the tip of the second lead has any one of an inclined shape, a curved shape, an L shape, a stepped shape, an acute shape, and any combination thereof, substantially the same operation and effect are obtainable.

The first lead and the second lead have the same or substantially the same length. The second lead includes a tip having a shape that is cut such that the tip and a side folding portion of the second terminal electrode form a predetermined angle. Accordingly, the solder can be applied in a gap formed by the predetermined angle and melted. The temperature sensor is naturally moved by the surface tension of the solder to a stable position and fixed. This can minimize the influence caused by the leads, the solder, and the externally applied stress. Thus, a temperature sensor with leads that has sufficient conductivity, high sensitivity that is stable electrically and mechanically, and excellent reliability can be achieved.

The above temperature sensor preferably is a surface-mount thermistor. Accordingly, compared with a plate temperature sensor, the distance between the terminal electrodes can be larger. Thus, solder bridges and migration are less prone to occur, so the occurrence of a short circuit between the terminal electrodes can be minimized. In addition, sufficient stability can be maintained without having to cover the exterior of the temperature sensor with the insulating member. Thus, a small temperature sensor with leads that has a simple structure and high reliability can be achieved.

The above temperature sensor includes an internal electrode. Therefore, even if the terminal electrodes and the thermistor become separated, the resistance value is governed by the internal electrode. The influence on the resistance value of the thermistor is significantly smaller than that in a plate thermistor.

In the temperature sensor with leads according to a preferred embodiment of the present invention, the surface of the surface-mount thermistor is covered with a glass layer. Accordingly, resistance to moisture is further improved, and high reliability is obtainable.

In the temperature sensor with leads according to a preferred embodiment of the present invention, the first and second leads are connected integrally in a longitudinal direction and define a parallel lead set. Accordingly, the connection portion between the terminal electrode and each of the first and second leads is prevented from being subjected to a stress that separates them. Therefore, a more reliable thermistor with leads is obtainable. The ease of use when a long lead is used is also improved.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described on the basis of the drawings.

Figure 1:
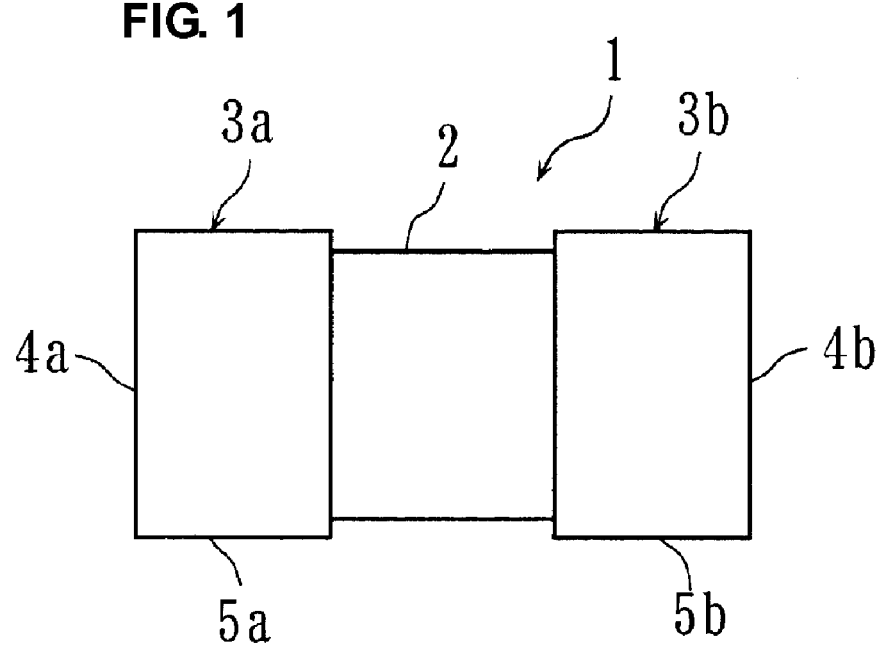
FIG. 1 is a front view that illustrates a surface-mount thermistor for use in a temperature sensor with leads according to a preferred embodiment of the present invention.
Figure 2:
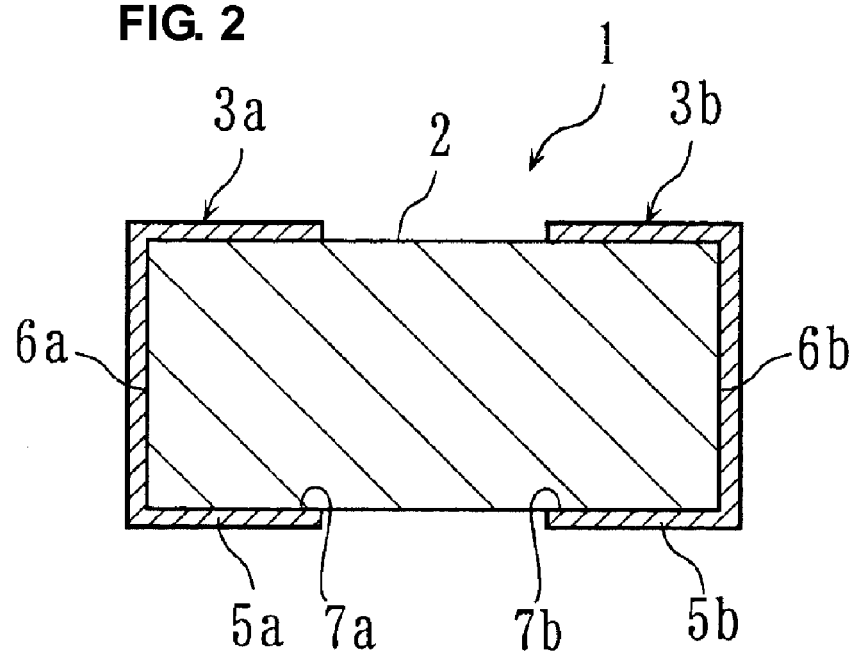
FIG. 2 is a cross-sectional view of FIG. 1.

FIG. 1 is a front view of a surface-mount thermistor for use in a temperature sensor with leads according to a preferred embodiment of the present invention. FIG. 2 is a cross-sectional view of FIG. 1.

In FIGS. 1 and 2, the thermistor 1 includes a thermistor body 2 having a substantially rectangular parallelepiped shape and predominantly composed of a ceramic material and terminal electrodes 3a and 3b disposed on both ends of the thermistor body 2. Each of the terminal electrodes 3a and 3b is preferably formed by baking and made of a conductive material, such as silver, copper, nickel, and tin, for example.

The terminal electrodes 3a and 3b include end surface portions 4a and 4b, respectively, and side folding portions 5a and 5b, respectively. As illustrated in FIG. 2, the terminal electrodes 3a and 3b are arranged so as to cover end surfaces 6a and 6b of the thermistor body 2 and four side surfaces of the thermistor body 2.

The use of the surface-mount thermistor 1 can achieve a relatively longer distance between the terminal electrodes 3a and 3b, compared with when a single plate thermistor in which an electrode layer is disposed on both main surfaces of a plate thermistor body, as illustrated in Japanese Unexamined Patent Application Publication No. 10-149903, is used. With the surface-mount thermistor 1, migration is less prone to occur, and the occurrence of short circuits of the terminal electrodes can be minimized.

In the surface-mount thermistor 1, the terminal electrodes 3a and 3b cover the end surfaces 6a and 6b of the thermistor body 2, respectively. The electrode of each of the end surface portions 4a and 4b is fixed on the thermistor body 2 more strongly than the electrode of each of the side portions, and they are soldered there. Accordingly, the electrode is less likely to be separated. Additionally, there is an advantage in which, even if that electrode is separated, the influence on the resistance value exerted by the electrode separation is small. That is, in the case of the surface-mount thermistor, as the electrode portion contributing to the resistance value, the side folding portions 5a and 5b are predominant over the soldered end surface portions 4a and 4b, so the influence on the resistance value exerted by the separation of the end surface electrode is small.

Figure 3:
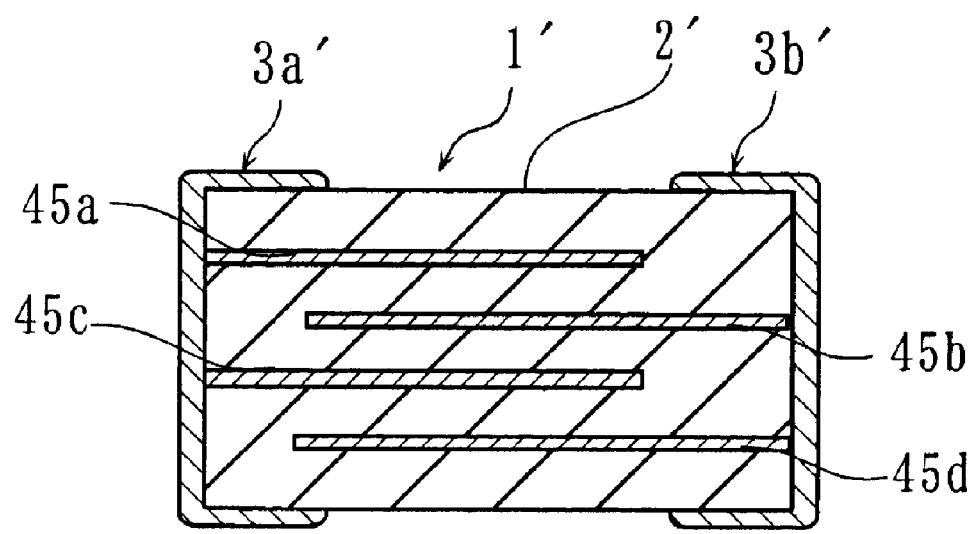
FIG. 3 is a cross-sectional view that illustrates a laminated thermistor serving as a surface-mount thermistor according to a preferred embodiment of the present invention.

As this type of the surface-mount thermistor, a laminated thermistor 1' illustrated in FIG. 3 may also preferably be used. That is, in the thermistor 1', internal electrodes 45a to 45d are buried in a thermistor body 2' in a parallel manner in the lamination direction. The internal electrodes 45a and 45c are electrically connected to a terminal electrode 3a'. The internal electrodes 45b and 45d are electrically connected to a terminal electrode 3b'. For the laminated thermistor 1', the resistance value is governed by the internal electrodes 45a to 45d. Accordingly, even if the thermistor body 2' and each of the terminal electrodes 3a' and 3b' become separated, the influence on the resistance value of the thermistor 1' is significantly smaller than that in a plate thermistor.

Because the surface-mount thermistors 1 and 1' are originally designed to withstand an external environment, they have high reliability and high environmental resistance. Accordingly, there is an advantage in which the influence exerted by mounting and processing of a lead is small and adjustment of characteristics or selection of characteristics of a thermistor element after mounting can be simplified.

The surface-mount thermistors 1 and 1' are also advantageous in that degradation and environmental resistance of the terminal electrodes 3a, 3b, 3a', and 3b' is excellent. In particular, it may be preferable that a plating film made of nickel or tin is formed on the surface of each of the terminal electrodes 3a, 3b, 3a', and 3b' because migration does not occur. A glass layer (not shown) may also be disposed on the surface of each of the thermistor bodies 2 and 2'. This can achieve enhanced moisture resistance, and high reliability is obtainable.

As each of the surface-mount thermistors 1 and 1', specifically, a chip thermistor having approximate outer dimensions of, for example, 1.0 mm in length, 0.5 mm in width, and 0.5 mm in thickness, or 0.6 mm in length, 0.3 mm in width, and 0.3 mm in thickness can be used.

In the following preferred embodiments, the thermistor 1, which has no internal electrodes 45a to 45d, is described as a typical example.

Figure 4:
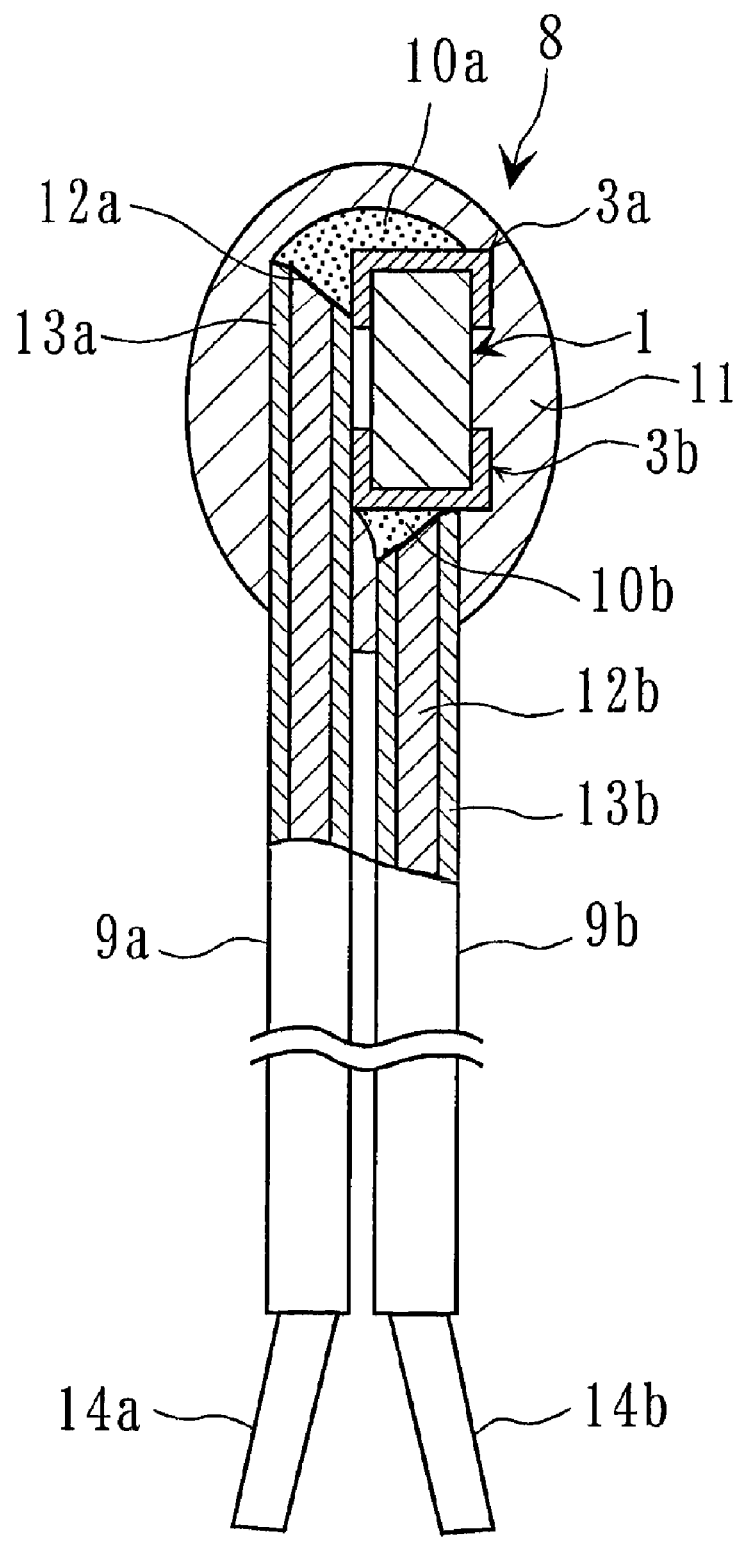
FIG. 4 is a frontal, partially broken-away view that illustrates a temperature sensor with leads according to a preferred embodiment of the present invention.

FIG. 4 is a frontal, partially broken-away view that illustrates a thermistor with leads according to a first preferred embodiment of the present invention.

In a thermistor 8 with leads, first and second long leads 9a and 9b are connected to the thermistor 1 through solder 10a and solder 10b. The exteriors of the tip region of each of the first and second leads 9a and 9b, the thermistor 1, and the solder 10a and solder 10b are covered with an insulating member 11.

In the first preferred embodiment, a case in which two solid leads are preferably used is illustrated. However, the use of a parallel lead set including two leads, as described below, may also be preferable.

The first lead 9a and the second lead 9b are arranged substantially parallel to each other. The first lead 9a is longer than the second lead 9b.

Figure 5:
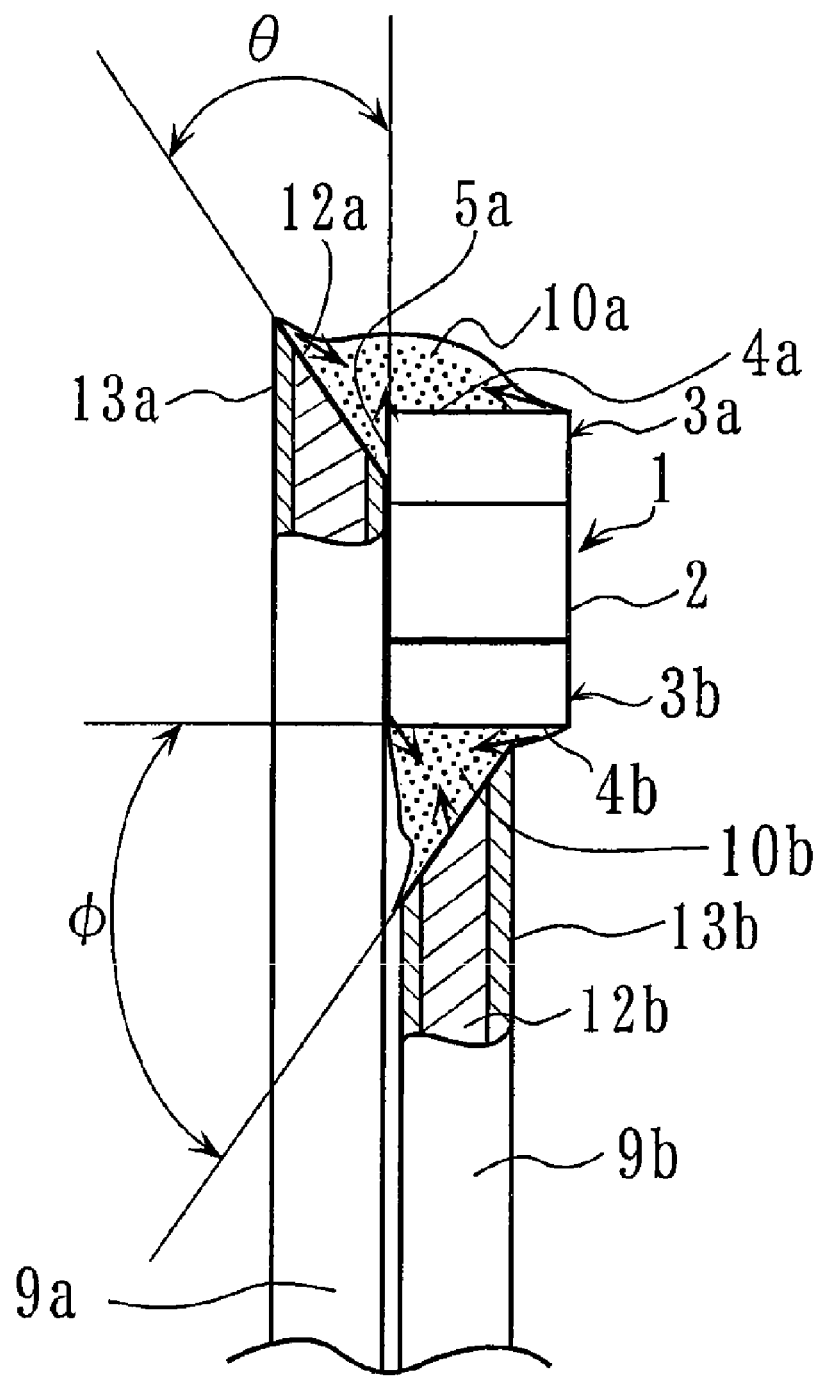
FIG. 5 is an illustration for use in describing an operation of the first preferred embodiment of the present invention.

Specifically, the first lead 9a has a metal line or core 12a covered with an insulating member 13a. The first lead 9a has an inclined tip that forms a predetermined angle θ to the side folding portion 5a of the one terminal electrode 3a, as illustrated in FIG. 5, and the metal line 12a is surface-exposed. In a termination portion 14a of the lead 9a, the insulating member 13a is removed, and the termination portion 14a is subjected to solder coating, as illustrated in FIG. 4.

Similar to the first lead 9a, the second lead 9b has a metal line or core 12b covered with an insulating member 13b. The insulating member 13b is removed in a termination portion 14b, and the termination portion 14b is subjected to solder coating. The second lead 9b has an inclined tip that forms a predetermined angle φ to the end surface portion 4b of the other terminal electrode 3b, as illustrated in FIG. 5, and the metal line 12b is surface-exposed.

In the thermistor 1, the thermistor body 2 is attached to a predetermined side position of the first lead 9a along the longitudinal direction of the thermistor body 2 such that the side folding portion 5a of the terminal electrode 3a and the first lead 9a form the predetermined angle θ, and the terminal electrode 3b is supported by the second lead 9b. The solder 10a is applied and melted in a region that is formed in a gap between the terminal electrode 3a and the tip of the first lead 9a and that contains a V-shaped recess. This electrically connects the first lead 9a and the terminal electrode 3a. The solder 10b is applied and melted in a gap between the tip of the second lead 9b and the terminal electrode 3b, and this electrically connects the second lead 9b and the terminal electrode 3b.

As described above, according to the first preferred embodiment, each of the first and second leads 9a and 9b has an inclined tip, and the metal lines 12a and 12b are surface-exposed. Accordingly, sufficient surface-exposed sections can be ensured. This can achieve a sufficiently large area in the solder connection portion and can also achieve a small distance between the exposed portion of the metal line 12a in the first lead 9a and the terminal electrode 3a in the thermistor 1 and a small distance between the exposed portion of the metal line 12b in the second lead 9b and the terminal electrode 3b in the thermistor 1. Accordingly, a sufficient soldering connection force can be ensured. Therefore, even if the metal lines 12a and 12b are very thin (e.g., the diameter is about 0.3 mm or less), there is no necessity to remove the covering insulating members 13a and 13b, so stable conduction is obtainable.

In the step of cutting the first and second leads 9a and 9b, the insulating members 13a and 13b may be slightly removed. Even in this case, such a removed portion does not matter.

In the first preferred embodiment, the step of removing the insulating member to expose the metal line is unnecessary, so the production process can be simplified, and the metal line can be prevented from being oxidized.

That is, traditionally, a lead in which a metal line is covered with an insulating member is typically used in order to prevent a short circuit caused by the leads coming into contact with each other in placing a temperature sensor. Accordingly, when a lead and a thermistor are connected, the step of removing the insulating member corresponding to the connection portion with the thermistor from the lead to expose the metal line is necessary, and the number of steps is unavoidably increased. This case is also disadvantageous in the processing accuracy, so it is difficult to reduce the size and cost. Moreover, because the metal line tends to be oxidized, if the insulating member is removed and the surface-exposed section of the metal line is left as it is for a long time, the detection accuracy may be degraded.

In contrast, with the first preferred embodiment, as described above, the step of removing an insulating member to expose a metal line is unnecessary. Accordingly, the production process can be simplified, and the metal line can be prevented from being oxidized.

In the first preferred embodiment, a cross section of each of the metal lines 12a and 12b is surface-exposed, so the area of the connection portion between the terminal electrode 3a and the metal line 12a and that between the terminal electrode 3b and the metal line 12b can be controlled with high precision.

That is, with a traditional method of removing an insulating member from a lead to expose a metal line, the amount of solder applied and the area of the connection tend to vary, so it is difficult to control them with high precision.

In contrast, with the first preferred embodiment, because a cross section of each of the metal lines 12a and 12b is surface-exposed, the amount of the area of solder for use in mounting can be controlled by use of the area of the cross section and the diameter of each of the first and second leads 9a and 9b. That is, variations in the amount of solder used in mounting can be reduced, and the mounting can be stable. This can reduce the amount of the solder 10a and solder 10b applied and can also reduce short-circuit defects. Accordingly, reliability can be improved, and the diameter of each of the metal lines 12a and 12b and the cost can also be reduced.

Furthermore, in the first preferred embodiment, because the solder 10a is applied and melted in a region that contains a gap between the first lead 9a and the terminal electrode 3a and the solder 10b is applied and melted in a gap between the second lead 9b and the terminal electrode 3b, the surface tension acts in the direction indicated by the arrows illustrated in FIG. 5. Accordingly, the thermistor 1 naturally moves to a predetermined position at which it can be stably maintained, and the thermistor 1 is fixed. Therefore, the thermistor with leads can have mechanical and electrical stability.

The thermistor 1 is maintained with respect to the first lead 9a such that the corner of the terminal electrode 3a from the end surface portion 4a to the side folding portion 5a of the terminal electrode 3a is covered. Accordingly, when an external force is provided in the direction in which the thermistor 1 becomes separated from the first lead 9a, the end surface portion 4a of the terminal electrode 3a receives an externally applied stress in the direction perpendicular to the first lead 9a. Therefore, even if an external thermal shock or mechanical stress is applied, the terminal electrodes 3a and 3b can be prevented from being separated from the thermistor body 2, and the thermistor body 2 can be prevented from being broken.

In the first preferred embodiment, the insulating member 11 covers the exterior of the thermistor 1. Instead of the covering with the insulating member 11, the influence caused by a stress from the first and second leads 9a and 9b or an externally applied shock can be reduced. Thus, the sensor can have favorable sensitivity.

The thermistor 1 is fixed to the first and second leads 9a and 9b more stably. Therefore, even if the exterior is covered with the insulating member 11 to improve environmental resistance performance, the influence caused by thermal expansion of the insulating member 11 can be minimized.

FIGS. 6A-6F are production process diagrams that illustrate steps for producing the above thermistor with leads.

Figure 6A:
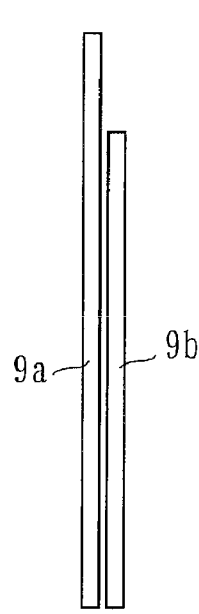
FIGS. 6A-6F are production process diagrams that illustrate steps for producing a temperature sensor with leads according to the first preferred embodiment of the present invention.
Figure 6B:
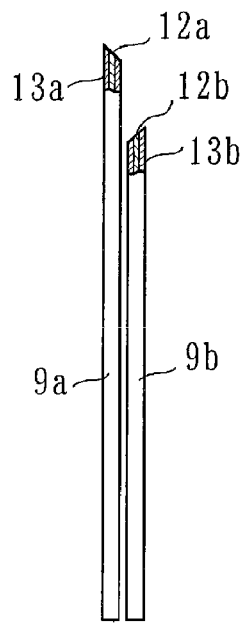
Figure 6C:
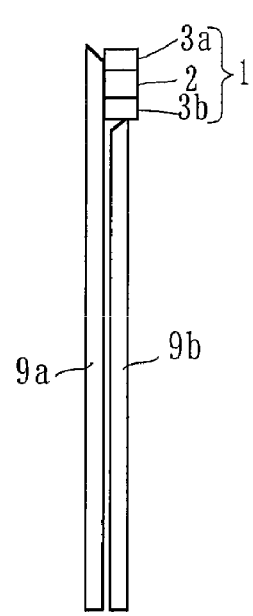

First, as illustrated in FIG. 6A, the first and second leads 9a and 9b having different lengths are prepared. Then, as illustrated in FIG. 6B, the tip of each of the first and second leads 9a and 9b is cut so as to have a mutually inwardly inclined shape, and each of the metal lines 12a and 12b is surface-exposed. Then, as illustrated in FIG. 6C, the thermistor 1 is arranged such that the thermistor body 2 is attached to a predetermined side position of the first lead 9a along the longitudinal direction of the thermistor body 2, and the terminal electrode 3b is supported by the tip of the second lead 9b.

Figure 6D:
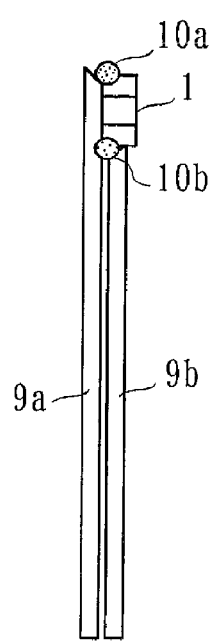
Figure 6E:
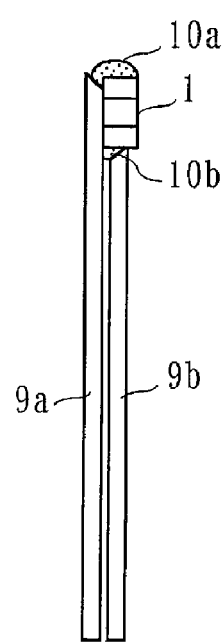
Figure 6F:
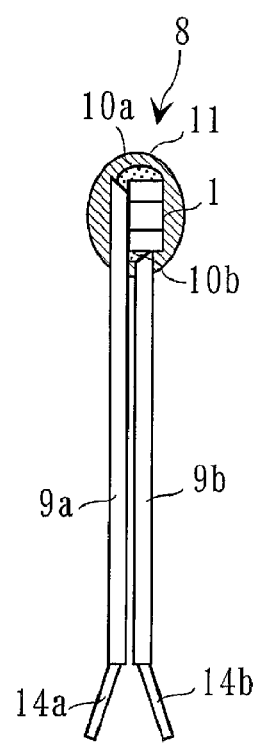

Then, as illustrated in FIG. 6D, the solder paste 10a and solder paste 10b made of, for example, Sn—Ag—Cu are applied to the connection portion between the first lead 9a and the terminal electrode 3a and the connection portion between the second lead 9b and the terminal electrode 3b, respectively. After that, the solder is melted by being heated by use of, for example, a warm air heater at a predetermined temperature (e.g., approximately 240° C.) for a predetermined period of time (e.g., about 5 seconds). As illustrated in FIG. 6E, the first and second leads 9a and 9b and the thermistor 1 are fixed through the solder 10a and solder 10b. As illustrated in FIG. 6F, the insulating member 11 is applied so as to cover the first and second leads 9a and 9b, the solder 10a and solder 10b, and the thermistor 1, and curing is performed at a predetermined temperature (e.g., approximately 150° C.) for a predetermined period of time (e.g., about 1 hour). Thereafter, a portion of each of the first and second leads 9a and 9b that corresponds to a predetermined distance (e.g., about 5 mm) from the lower end of each of the first and second leads 9a and 9b is immersed in a solder pot at a predetermined temperature (e.g., about 360° C.) in order to remove the insulating members 13a and 13b at that portion and make the first and second leads 9a and 9b at that portion be the termination portions 14a and 14b, respectively, and solder coating is performed thereon. In such a way, a thermistor 8 with leads is produced.

Figure 7C:
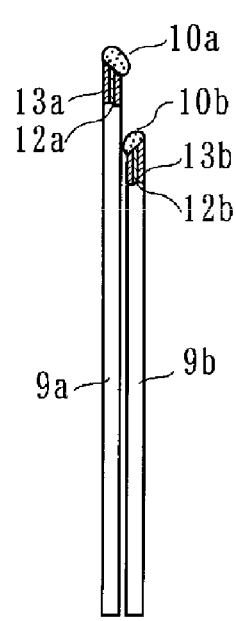
FIGS. 7C'-7E' are main production process diagrams that illustrate a modified example of the production steps.

FIGS. 7C'-E' are main production process diagrams that illustrate a modified example of the production steps for the above thermistor with leads.

First, similar to FIGS. 6A and 6B, the tips of the first and second leads 9a and 9b having different lengths are cut. After that, as illustrated in FIG. 7C', the surface-exposed section of the metal line 12a and that of the metal line 12b are pre-coated with the solder 10a and solder 10b, respectively.

The solder pre-coating can be formed by immersing only the tip of each of the first and second leads 9a and 9b in molten solder or applying solder paste to the tip of each of the first and second leads 9a and 9b, then heating and melting the solder, and wetting and spreading the solder over the surface-exposed section of each of the metal lines 12a and 12b.

Figure 7D:
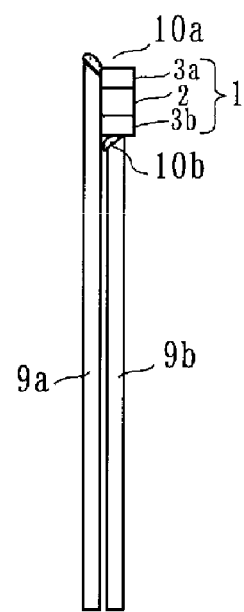
Figure 7E:
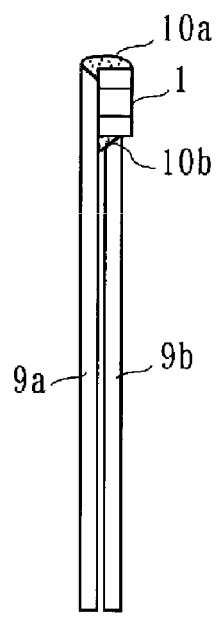

Then, as illustrated in FIG. 7D', the thermistor 1 is set in contact with the pre-coating solder 10a and 10b. Thereafter, the solder is heated and melted, and as illustrated in FIG. 7E', the terminal electrodes 3a and 3b of the thermistor 1 are connected to the surface-exposed sections of the metal lines 12a and 12b, respectively.

After that, a step similar to FIG. 6F is performed. In such a way, the thermistor 8 with leads can be produced.

In the modified example illustrated in FIGS. 7C'-7E', before the thermistor 1 is set, the first and second leads 9a and 9b are pre-coated with the solder, and then, the thermistor 1 is soldered to the first and second leads 9a and 9b. Accordingly, it is possible to readily obtain a temperature sensor with leads suited for high manufacturability and miniaturization of the thermistor 1.

In connecting the thermistor 1 and the first lead 9a, performing heating while pressing the thermistor 1 against the first lead 9a can achieve the obtainment of the thermistor 8 with leads that has more favorable connectivity.

Figure 8:
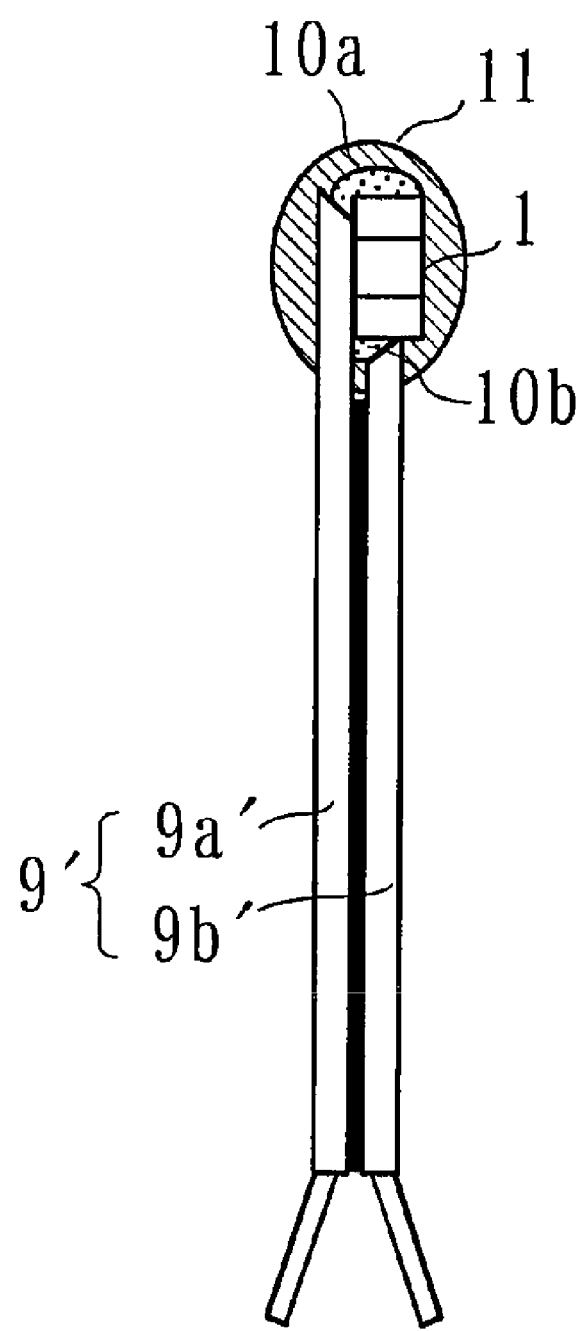
FIG. 8 is a frontal view that illustrates one example of a temperature sensor with leads when a parallel lead set is used.

FIG. 8 is a front view of a thermistor 8' with leads that uses a parallel lead set 9'. The parallel lead set 9' includes first and second leads 9a' and 9b' integrally connected together along the longitudinal direction.

The use of such a parallel lead set prevents the connection portion between the terminal electrode 3a and the first lead 9a' and that between the terminal electrode 3b and the second lead 9b' from being subjected to a stress that separates them, so a more reliable thermistor with leads is obtainable.

In addition, for the thermistor 8 with leads illustrated in FIG. 4, the first and second leads 9a and 9b are separated discrete leads. Thus, if long leads are used, the ease of use of leads as a set may be degraded. Accordingly, in particular, if long leads are used, the preferred embodiment illustrated in FIG. 8 may be preferable.

The structure and production method are substantially the same as in FIGS. 4 to 7E', so the description thereof is omitted.

Figure 9:
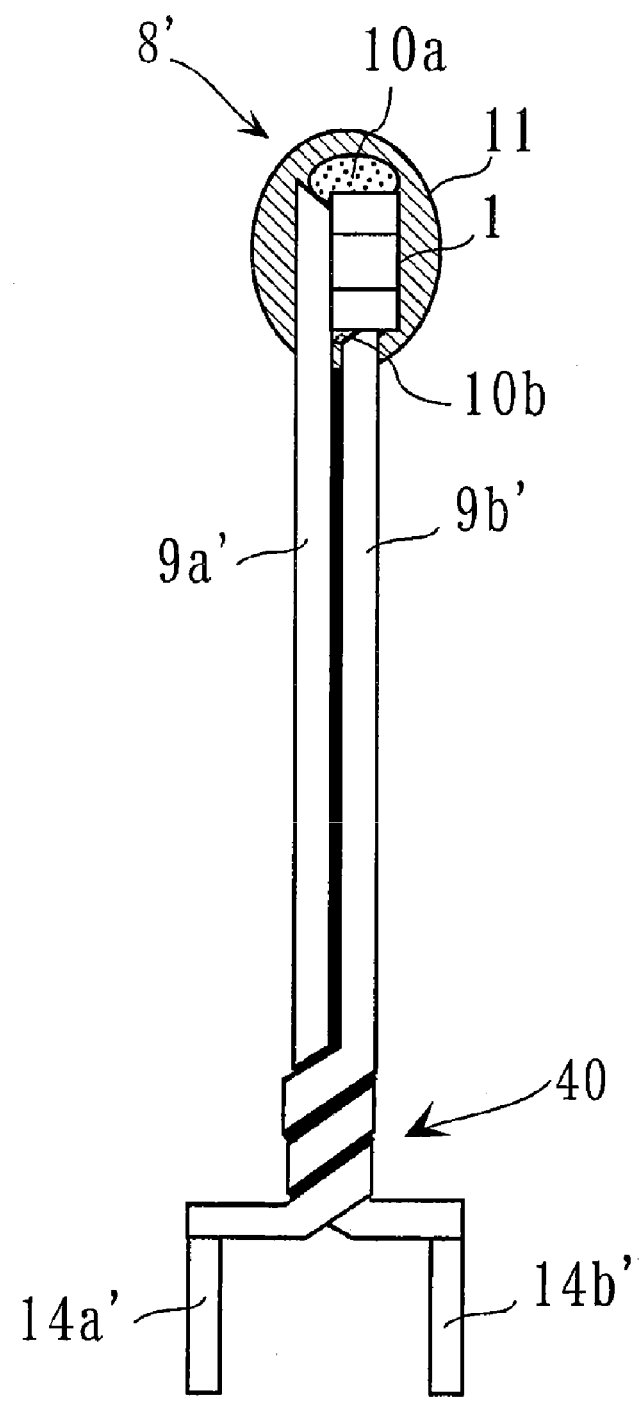
FIG. 9 illustrates a first example mounting structure according to the first preferred embodiment of the present invention.

FIG. 9 is a front view that illustrates a first example mounting structure according to the first preferred embodiment. This illustrates an example mounting structure when a temperature sensor with leads according to a preferred embodiment of the present invention is produced using a parallel lead set.

That is, in the first example mounting structure, after termination portions 14a' and 14b' of the first and second leads 9a' and 9b' are bent into an L shape, the first and second leads 9a' and 9b' are further bent into an L shape so as to have a lead distance corresponding to an insertion distance of a mounting substrate. Then, the sections immediately above the termination portions 14a' and 14b' are rotated 180° or more at appropriate times (e.g., 1 to 5 times), and a twist portion 40 is thus formed.

When a parallel lead set is used, the strength of the connection between the first and second leads 9a' and 9b' is relatively low, and the first and second leads 9a' and 9b' can be split.

In the first example mounting structure, after the termination portions 14a' and 14b' of the first and second leads 9a' and 9b' are bent such that the distance between the termination portions 14a' and 14b' corresponds to an insertion distance of a mounting board, the twist portion 40 is formed immediately above the termination portions 14a' and 14b'. This makes the first and second leads 9a' and 9b' less prone to being split.

In the case of a parallel lead set, two leads are in a connected state, in FIG. 9, it is easy to be bent in the horizontal direction, but it is less prone to be bent in the back and forth direction, with respect to the parallel direction.

The provision of the twist portion 40 enables the leads to be easily bent in any direction, so the bending direction characteristics are improved.

Figure 10:
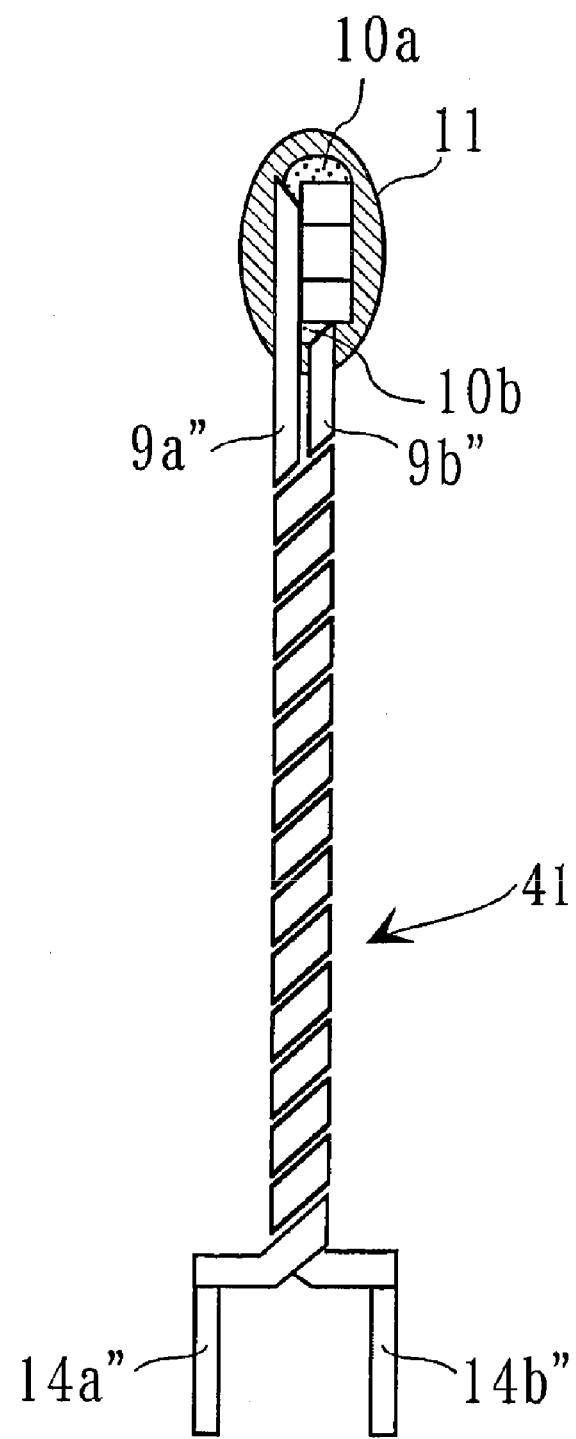
FIG. 10 illustrates a second example mounting structure according to the first preferred embodiment of the present invention.

FIG. 10 is a front view that illustrates a second example mounting structure according to the first preferred embodiment. This illustrates an example mounting structure when a temperature sensor with leads according to a preferred embodiment of the present invention is produced using two solid leads.

That is, also in the second example mounting structure, similar to the first example manufacturing structure (FIG. 9), after the termination portions 14a" and 14b" of the first and second leads 9a" and 9b" are bent in an L shape, the first and second leads 9a" and 9b" are further bent in an L shape. In this second example mounting structure, a twist portion 41 is thus formed by twisting the sections of the first and second leads 9a" and 9b" exposed from the insulating member 11 (excluding the termination portions 14a" and 14b"), and the first and second leads 9a" and 9b" are integrated.

The integration of the first and second leads 9a" and 9b" each being a solid lead enables the two leads 9a" and 9b" to be dealt with integrally, as in the case where a parallel lead set is used.

Figure 11:
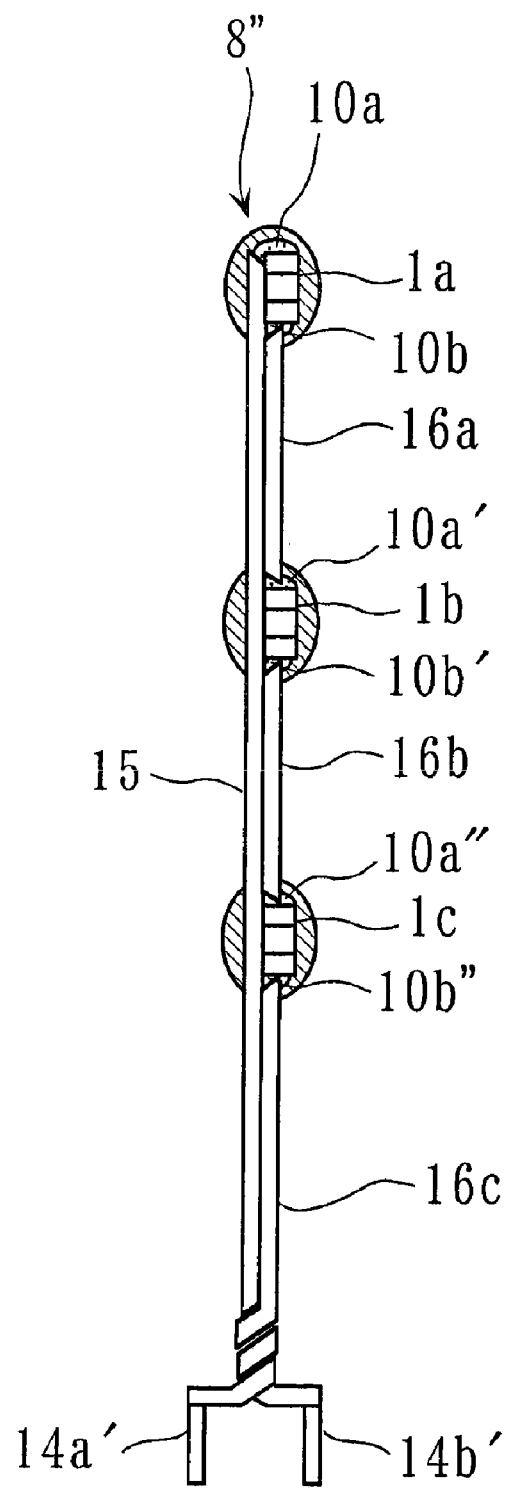
FIG. 11 illustrates a third example mounting structure according to the first preferred embodiment of the present invention.

FIG. 11 illustrates a third example mounting structure according to the first preferred embodiment. This illustrates an example in which multiple thermistors 1 are connected.

That is, in the third example mounting structure, three thermistors 1a to 1c are attached at a predetermined side position of a first lead 15. The first lead 15 is electrically connected to the leading thermistor 1 through the solder 10a. Second leads 16a, 16b, and 16c are electrically connected to the thermistors 1a to 1c through the solder 10b, 10a', 10b', 10a", and 10b".

When measurement points are present in series, multiple thermistors with leads may also preferably be used.

In the above preferred embodiment, the first lead 9a preferably has an inclined tip. The tip may have a stepped shape, a curved shape, an acute shape, and any combination thereof as long as the tip and a side folding portion 7a of the terminal electrode 3a form the predetermined angle θ. Various modifications can also be made in the second lead 9b.

Figure 12:
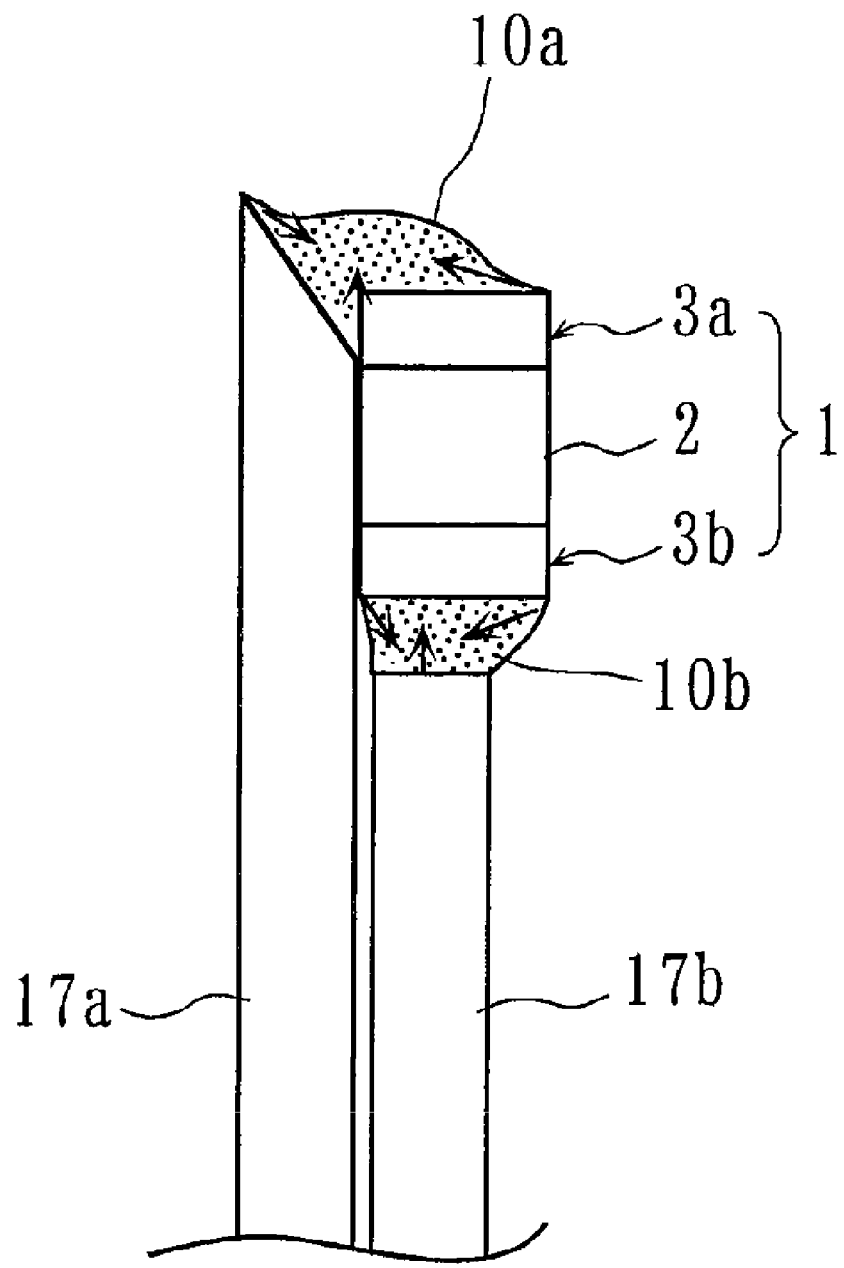
FIG. 12 illustrates one modified example of a tip shape of a lead according to the first preferred embodiment of the present invention.

FIG. 12 illustrates a modified example of the tip shape of a first lead according to the first preferred embodiment. In this modified example, a first lead 17a is formed so as to be inclined, whereas a second lead 17b is horizontally cut such that the metal line is surface-exposed.

That is, because a stress tends to be applied to the terminal electrode 3b in a direction that pulls the terminal electrode 3b outwardly, the second lead may preferably have an inclined tip in which the length in the vertical direction reduces from the outward to the inward, as illustrated in FIG. 5. As illustrated in FIG. 12, a surface tension acts in the solder 10b in the direction indicated by the arrows to maintain a stable shape. Therefore, even if the tip has a horizontal shape, conductivity and mechanical strength are not degraded, so a thermistor with leads that has desired high sensitivity is obtainable.

FIGS. 13A-13I illustrate various modified examples of a tip shape of each of first and second leads. The directions indicated by the arrows in the drawing represent a direction in which a surface tension acts.

Figure 13A:
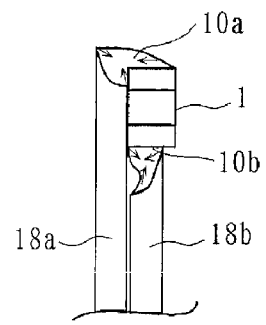
FIGS. 13A-13I illustrate various modified examples of a tip shape of a lead according to the first preferred embodiment of the present invention.
Figure 13B:
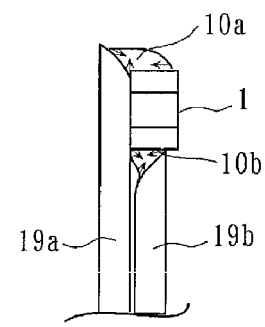
Figure 13C:
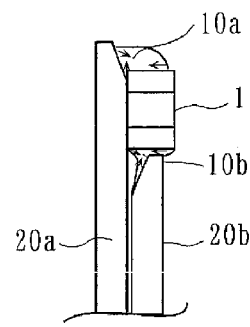

In FIG. 13A, a first lead 18a is curved concavely on the whole from the outward to the inward, and a second lead 18b is inclined from the outward to the inward and has a concave curved shape in about the middle. In FIG. 13B, a first lead 19a is curved convexly from the outward to the inward, and a second lead 19b is inclined from the outward to the inward and has a convex curved shape in about the middle. In FIG. 13C, first and second leads 20a and 20b have a shape in which an outward section is horizontal and a section from about the middle to the inward is inclined.

Figure 13D:
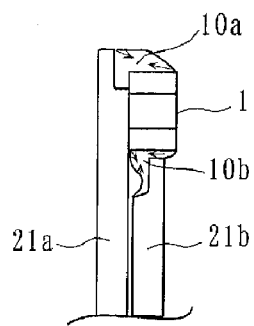
Figure 13E:
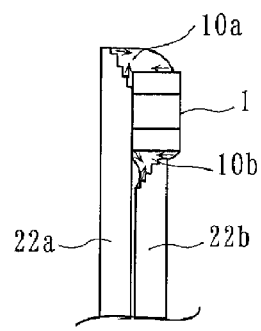
Figure 13F:
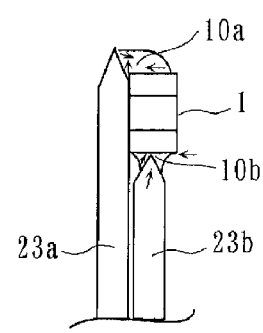

In FIG. 13D, first and second leads 21a and 21b are L-shaped or substantially L-shaped. In FIG. 13E, first and second leads 22a and 22b have a stepped shape from the outward to the inward toward a lower position. In FIG. 13F, first and second leads 23a and 23b are both acute.

Figure 13G:
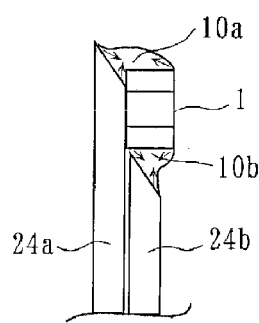
Figure 13H:
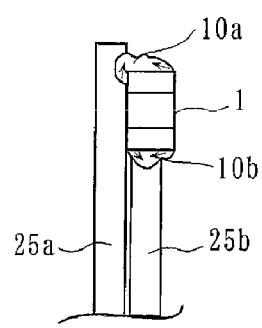
Figure 13I:
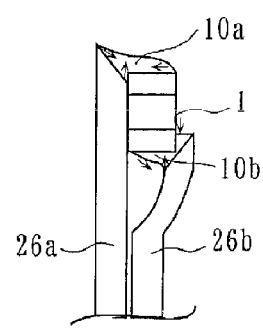

In FIG. 13G, a first lead 24a has an inclined shape similar to that in FIG. 4, and a second lead 24b is inclined in the same direction as in the first lead 24a. In FIG. 13H, a first lead 25a has a curved concave side shape, and a second lead 25b has a curved concave upper shape. In FIG. 13I, a first lead 26a has the same tip shape as in FIG. 13G. A section adjacent to the tip of a second lead 26b is curved outward, and the second lead 26b is inclined from the outward and is curved concavely from about the middle.

In any of the modified examples, the side folding portion of the terminal electrode 3a and each of the first leads 18a to 26a and form the predetermined angle θ, and a surface tension of solder acts in the directions indicated by the arrows. The end surface portion of the terminal electrode 3b and each of the second leads 18b to 26b form the predetermined angle φ, and a surface tension of solder acts in the directions indicated by the arrows. As a result, the thermistor 1 is moved at a predetermined position and fixed so as to be stably maintained.

Accordingly, even if thermal shock is applied from the outside, a mechanical stress is less prone to occur, and sufficient conduction can be ensured. Therefore, a thermistor with leads that has favorable detection sensitivity and high reliability is obtainable.

Figure 14A:
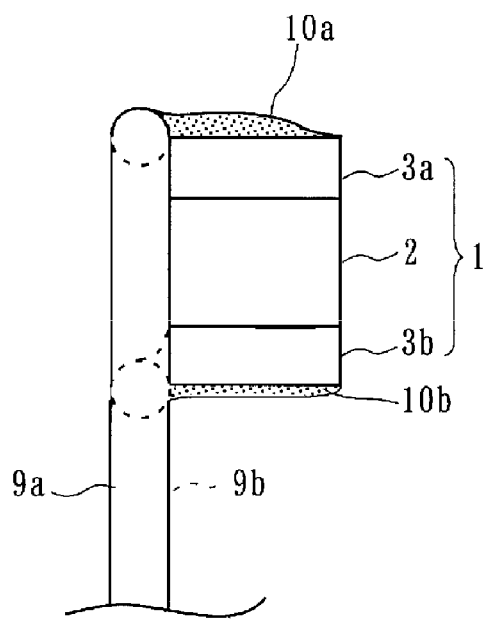
FIGS. 14A and 14B illustrate a main portion of a modified example of a temperature sensor with leads according to the first preferred embodiment of the present invention.
Figure 14B:
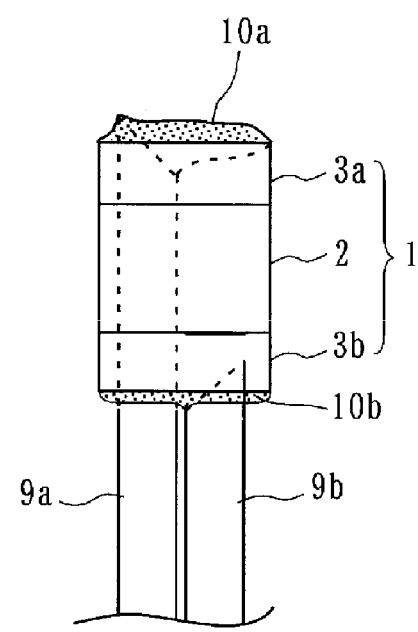

FIGS. 14A and 14B illustrates a main portion of a modified example of a temperature sensor with leads according to the first preferred embodiment. FIG. 14A is a left side view, and FIG. 14B is a front view.

In this modified example, the thermistor 1 is placed on the first and second leads 9a and 9b. That is, after the thermistor 1 is placed on the first and second leads 9a and 9b, the thermistor 1 is soldered to the first and second leads 9a and 9b in a stable state.

In the modified example illustrated in FIGS. 14A and 14B, when a stress that opens the first and second leads 9a and 9b is applied, a tensile stress is not applied in the solder connection portion, but a shearing stress is applied. Unlike a tensile stress, a shearing stress does not cause separation of electrodes. Accordingly, a temperature sensor with leads that has high reliability is obtainable.

A temperature sensor with leads according to a second preferred embodiment of the present invention is described below.

Figure 15:
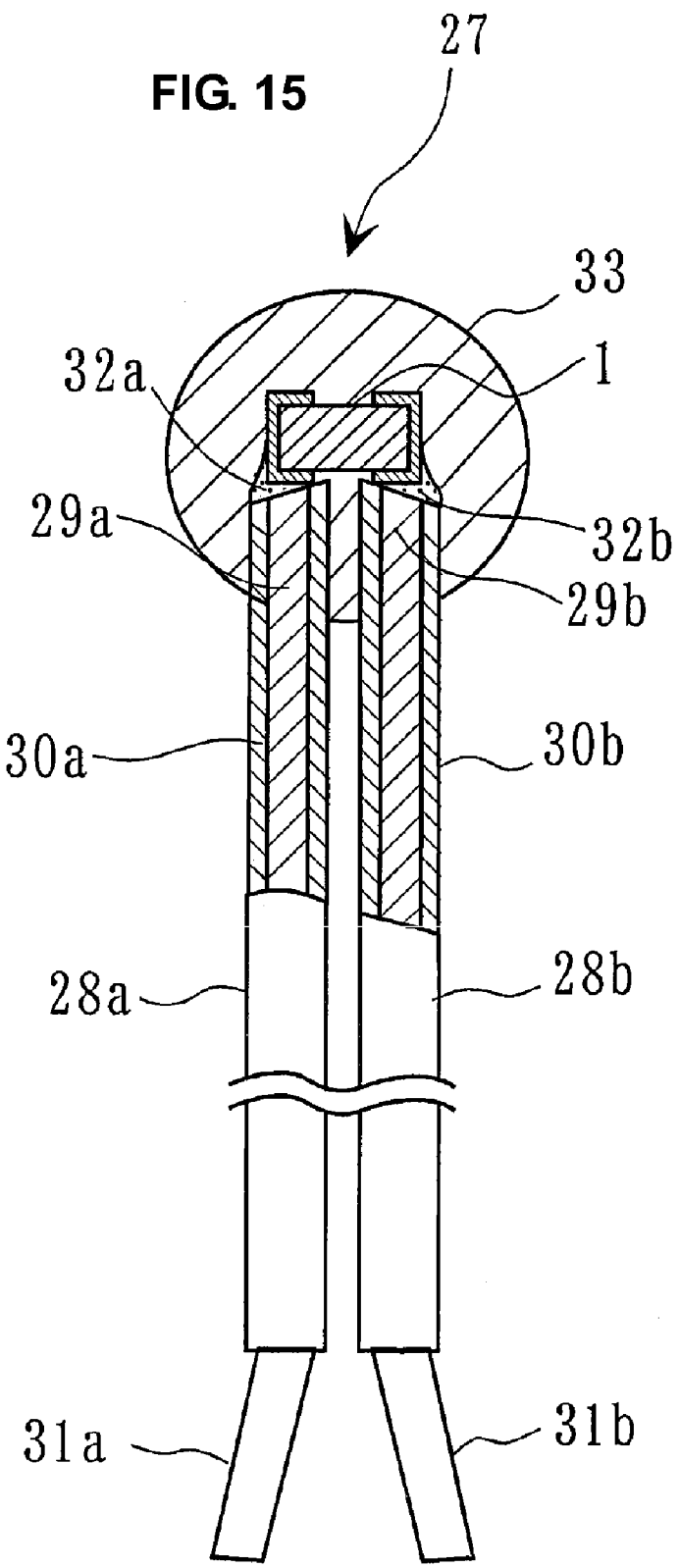
FIG. 15 is a frontal, partially broken-away view that illustrates a temperature sensor with leads according to a second preferred embodiment of the present invention.

FIG. 15 is a frontal, partially broken-away view of a thermistor with leads according to the second preferred embodiment.

Figure 16:
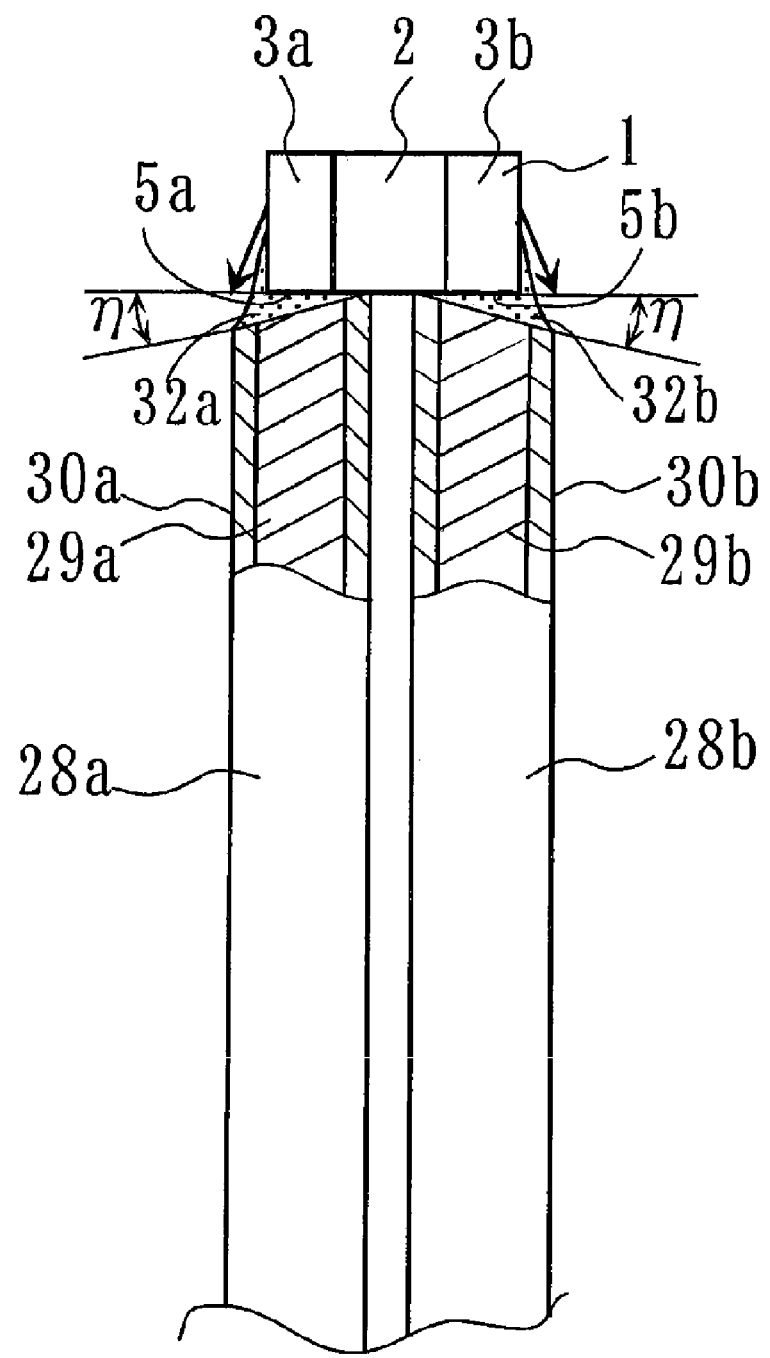
FIG. 16 is an illustration for use in describing an operation of the second preferred embodiment of the present invention.

In the thermistor 27 with leads, first and second leads 28a and 28b having the same or substantially the same length are arranged in substantially parallel with each other. Similar to the first preferred embodiment, metal lines or cores 29a and 29b in the first and second leads 28a and 28b are covered with insulating members 30a and 30b, respectively. In addition, as illustrated in FIG. 16, each of the first and second leads 28a and 28b has a tip inclined from the outward to the inward such that the tip and each of the side folding portion 5a of the terminal electrode 3a and the side folding portion 5b of the terminal electrode 3b form a predetermined angle η, and the metal lines 29a and 29b are surface-exposed. The insulating members 30a and 30b at the termination portions 31a and 31b are removed, and the termination portions 31a and 31b are subjected to solder coating.

The thermistor 1 is supported by the top of each of the first and second leads 28a and 28b. The thermistor 1 and the first and second leads 28a and 28b are electrically connected to each other through solder 32a and solder 32b, respectively.

In the second preferred embodiment, similar to the first preferred embodiment, the exterior region that covers the tip of each of the first and second leads 28a and 28b, the thermistor 1, and the solder 32a and solder 32b is covered with an insulating member 33.

In such a way, in the second preferred embodiment, the first and second leads 28a and 28b have the same or substantially the same length, are inclined such that the angle to each of the side folding portions 5a and 5b is the predetermined angle η, and the metal lines 29a and 29b are surface-exposed. Accordingly, the area of the exposed section of each of the metal lines 29a and 29b can be relatively large, sufficient surface-exposed section can be ensured. Even if the metal lines 29a and 29b are very thin (e.g., the diameter is about 0.3 mm or less), there is no necessity to remove the covering insulating members 30a and 30b, so stable conduction is obtainable.

A cross section of each of the metal lines 29a and 29b is surface-exposed, so the area of the connection portion between the terminal electrode 3a and the metal line 29a and that between the terminal electrode 3b and the metal line 29b can be controlled with high precision. The amount of the solder 32a and solder 32b applied can be reduce, and short-circuit defects can also be reduced. Accordingly, reliability can be improved.

When the solder 32a and solder 32b are melted, the surface tension acts in the direction indicated by the arrows illustrated in FIG. 16. Accordingly, the thermistor 1 naturally moves to a predetermined position at which it can be stably maintained, and the thermistor 1 is fixed. Thus, the thermistor 27 with leads that has reduced waste in terms of electricity and arrangement and that has high sensitivity is obtainable.

In particular, because the tip of the lead 28a is inclined from the inward to the outward of the lead, the solder 32a and solder 32b do not flow into the side central portion of the thermistor 1. Accordingly, short circuits of the terminal electrodes 3a and 3b can be prevented, and this is suitable.

In the second preferred embodiment, the exterior of the thermistor 1 is covered with the insulating member 33. Similar to the first preferred embodiment, even if the thermistor 1 is not covered with the insulating member 33, the influence caused by a stress received from the first and second leads 28a and 28b or shock externally provided can be minimized, and favorable sensitivity is obtainable.

Because the thermistor 1 is stably fixed to the first and second leads 28a and 28b, even if the insulating member 33 covers the exterior thereof to improve environmental resistance performance, the influence caused by thermal expansion can be minimized.

FIGS. 17A-17F are production process diagrams that illustrate steps for producing a temperature sensor with leads according to the second preferred embodiment.

Figure 17A:
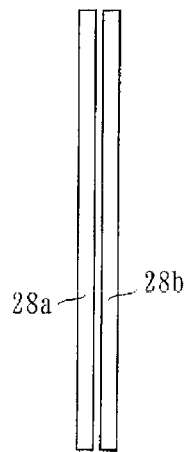
FIGS. 17A-17F are production process diagrams that illustrates steps for producing a temperature sensor with leads according to the second preferred embodiment of the present invention.
Figure 17B:
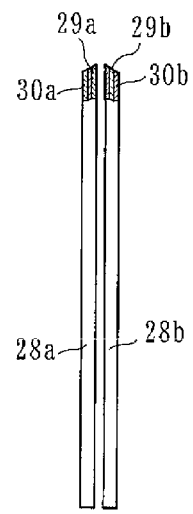
Figure 17C:
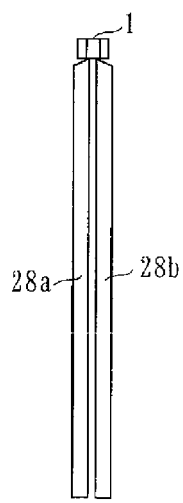

First, as illustrated in FIG. 17A, the first and second leads 28a and 28b having the same or substantially the same length are prepared. Then, as illustrated in FIG. 17B, the tip of each of the first and second leads 28a and 28b is cut so as to have a mutually outwardly inclined shape, and the metal lines 29a and 29b are surface-exposed. Then, as illustrated in FIG. 17C, the thermistor 1 is set so as to be supported by the tip of each of the first and second leads 28a and 28b.

Figure 17D:
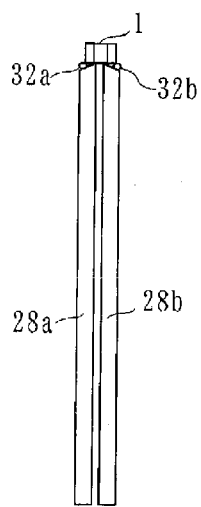
Figure 17E:
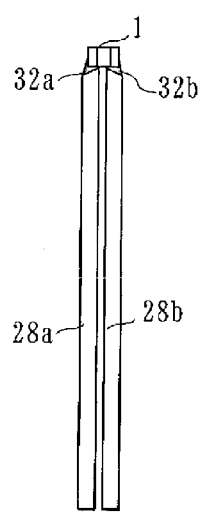
Figure 17F:
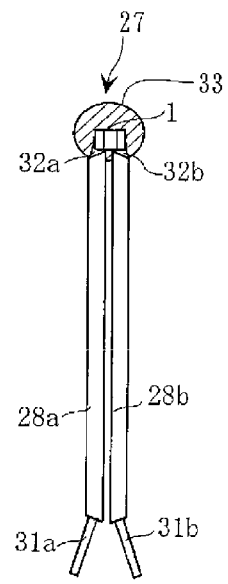

Then, as illustrated in FIG. 17D, the solder paste 32a and solder paste 32b made of, for example, Sn—Ag—Cu are applied to a gap between the thermistor 1 and each of the first and second leads 28a and 28b. After that, the solder is heated and melted by use of, for example, a warm air heater at a predetermined temperature (e.g., approximately 240° C.) for a predetermined period of time (e.g., about 5 seconds). As illustrated in FIG. 17E, the first and second leads 28a and 28b and the thermistor 1 are fixed through the solder 32a and solder 32b. As illustrated in FIG. 17F, the insulating member 33 is applied so as to cover the first and second leads 28a and 28b, the solder 32a and solder 32b, and the thermistor 1, and curing is performed at a predetermined temperature (e.g., approximately 150° C.) for a predetermined period of time (e.g., about 1 hour). Thereafter, a portion of each of the insulating members 30a and 30b that corresponds to a predetermined distance (e.g., about 5 mm) from the lower end of each of the first and second leads 28a and 28b is removed and the portions are made to be the termination portions 31a and 31b. The termination portions 31a and 31b are immersed in a solder pot at a predetermined temperature (e.g., approximately 360° C.), and solder coating is performed thereon. In such a way, a thermistor 27 with leads is produced.

Also in the second preferred embodiment, similar to the first preferred embodiment, a process for achieving any one of the mounting structures illustrated in FIGS. 9 to 11 can be performed, and a shape suited for mounting can be made.

Figure 18:
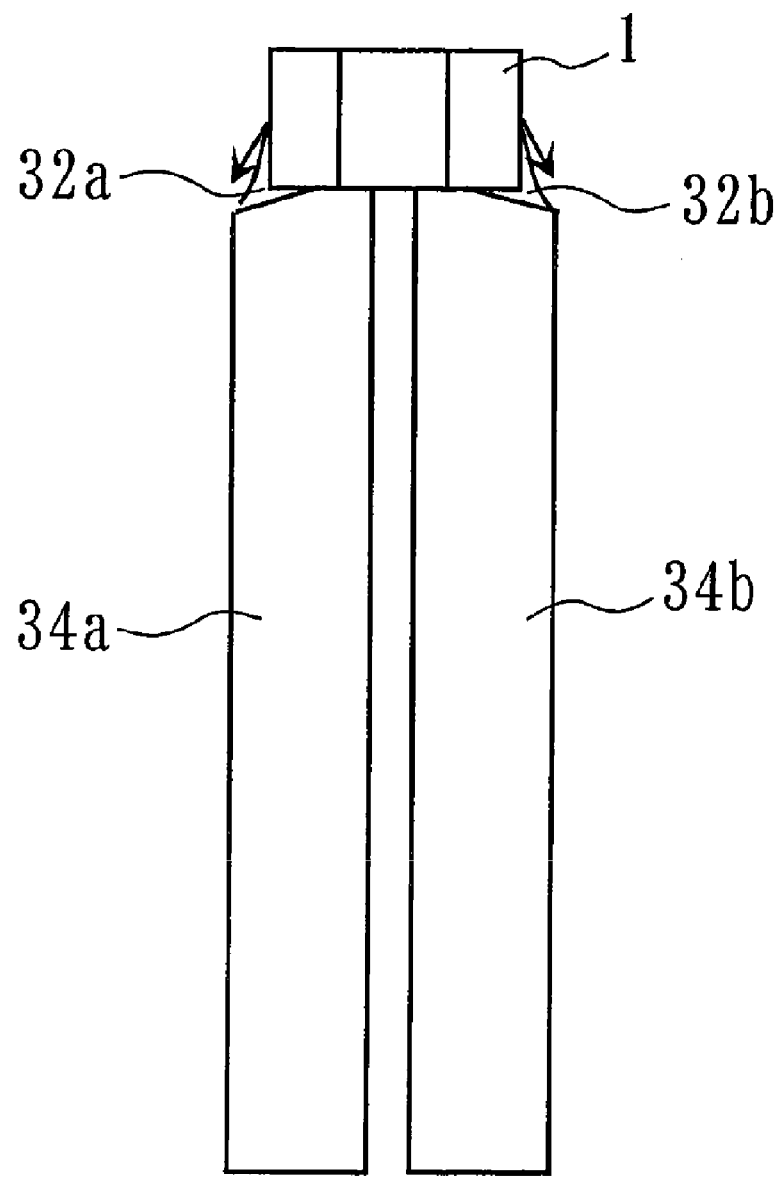
FIG. 18 illustrates one modified example of a tip shape of a lead according to the second preferred embodiment of the present invention.

FIG. 18 illustrates a modified example of a tip shape of a lead according to the second preferred embodiment.

That is, in the above-described second preferred embodiment, each of the first and second leads 28a and 28b has a tip shape being inclined on the whole from the inward to the outward. In this modified example, each of first and second leads 34a and 34b has a tip shape being partly horizontal and being inclined from about the middle to the outward.

Also in this case, when the solder 32a and solder 32b are melted, the surface tension acts in the direction indicated by the arrows illustrated in FIG. 18. Accordingly, as in the case illustrated in FIG. 16, the thermistor 1 naturally moves to a predetermined position at which it can be stably maintained, and the thermistor 1 is fixed. That is, the solder 32a and solder 32b are solidified along the first and second leads 34a and 34b. Thus, the thermistor 1 can also be fixed at a stable position, and the thermistor 27 with leads that has reduced waste in terms of electricity and arrangement and that has high sensitivity is obtainable.

In the above second preferred embodiment, a case in which two solid leads are used is described. However, substantially the same applies to a case where a parallel lead set composed of two leads is used.

The use of a parallel lead set prevents the connection portion between the terminal electrode and each of the first and second leads from being subjected to a stress that separates them, so a more reliable thermistor with leads is obtainable.

The present invention is not limited to the above-described preferred embodiments. For example, a temperature sensor is applicable to a positive characteristic thermistor and a negative characteristic thermistor.

It is preferable that copper having favorable solder wettability be used in a metal line forming the first and second leads. However, the material is not limited to copper as long as it can be soldered. For example, iron, nickel, an alloy thereof, a composite material thereof can also be used. The material of an insulating member for covering a metal line is not limited to a specific one as long as the material has heat resistance that can stand reflow soldering process. For example, urethane resin, acrylic resin, and fluorocarbon resin can be used.

One of the advantages of various preferred embodiments of the present invention is that there is no need to cover the exterior of a temperature sensor with an insulating member, as in a traditional art, and this achieves a temperature sensor having higher sensitivity. However, as described in the first and second preferred embodiments, the insulating members 11 and 13 are allowed to cover the exterior. In this case, as the insulating members 11 and 13 for covering the exterior, epoxy resin, acrylic resin, urethane resin, silicon resin, and ethylene resin can be used, for example.

APPLIED EXAMPLES

A thermistor with leads can be applied in various fields that need temperature detection.

For example, a temperature sensing portion of the thermistor can be arranged at a maximum heat point of a battery cell of a cellular phone as a measurement point. Accordingly, charging and discharging the battery can be controlled with high precision.

Figure 19:
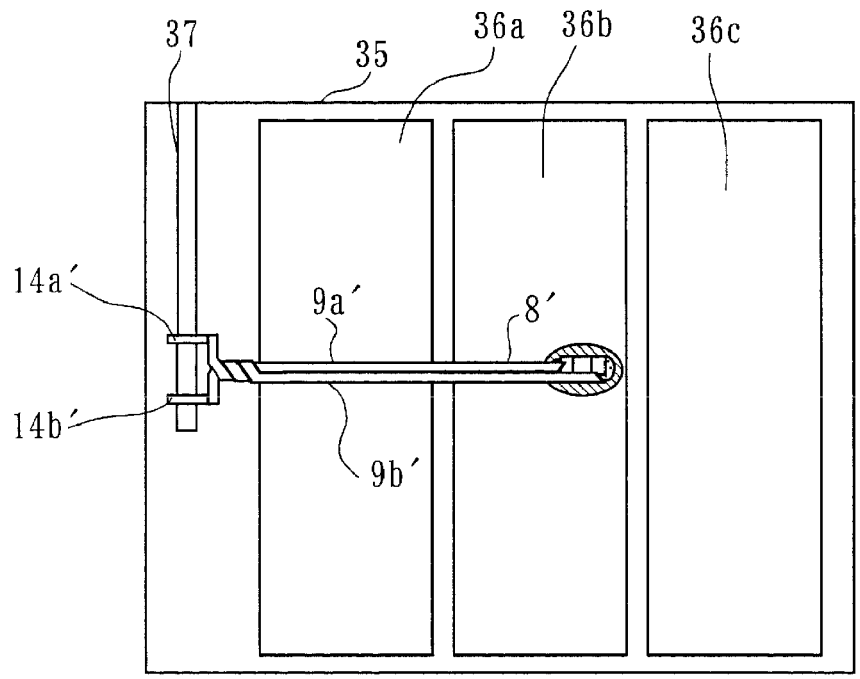
FIG. 19 schematically illustrates a temperature sensor with leads according to one applied example of a temperature sensor with leads according to a preferred embodiment of the present invention.
Figure 20:
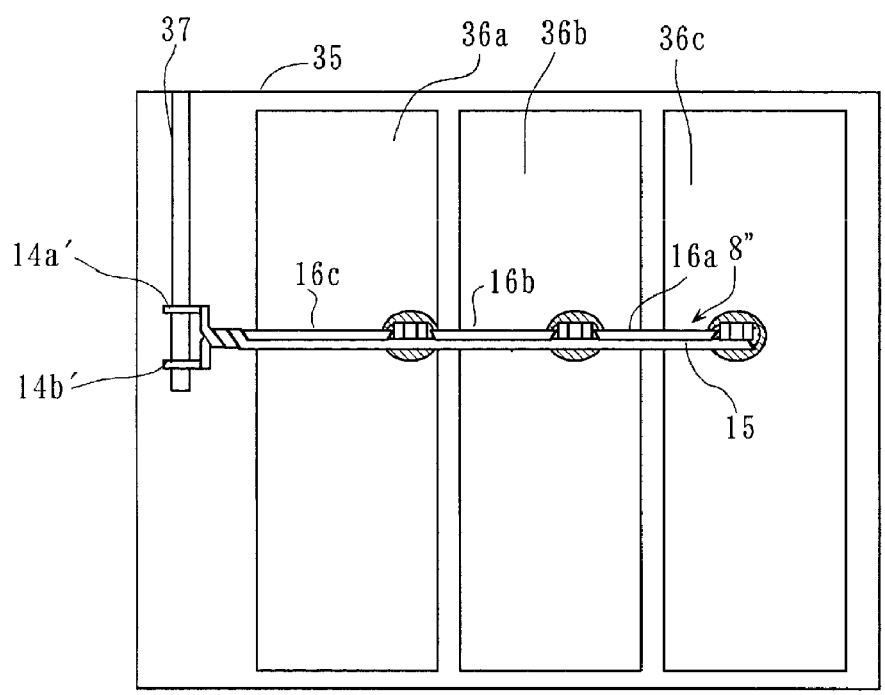
FIG. 20 schematically illustrates a temperature sensor with leads according to another applied example of a temperature sensor with leads according to a preferred embodiment of the present invention.
Figure 21:
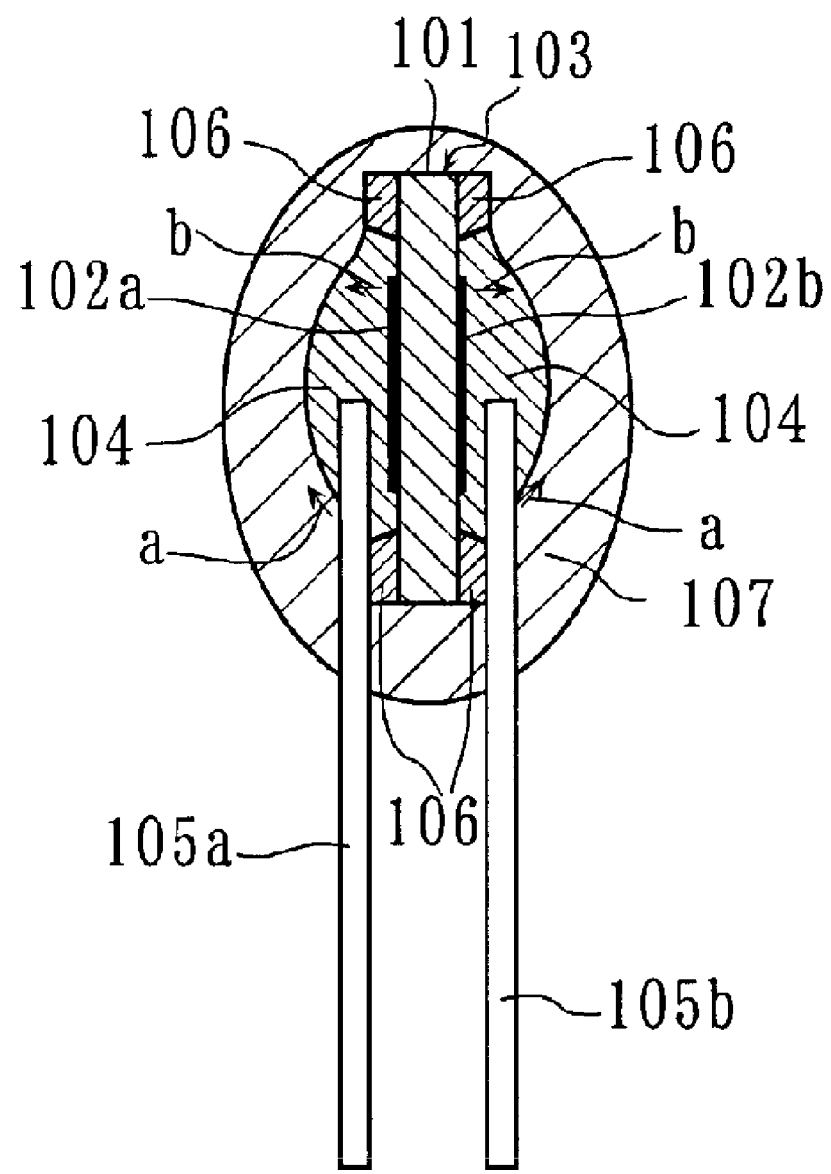
FIG. 21 is a cross-sectional view of a temperature sensor with leads described in Japanese Unexamined Patent Application Publication No. 10-149903.
Figure 22:
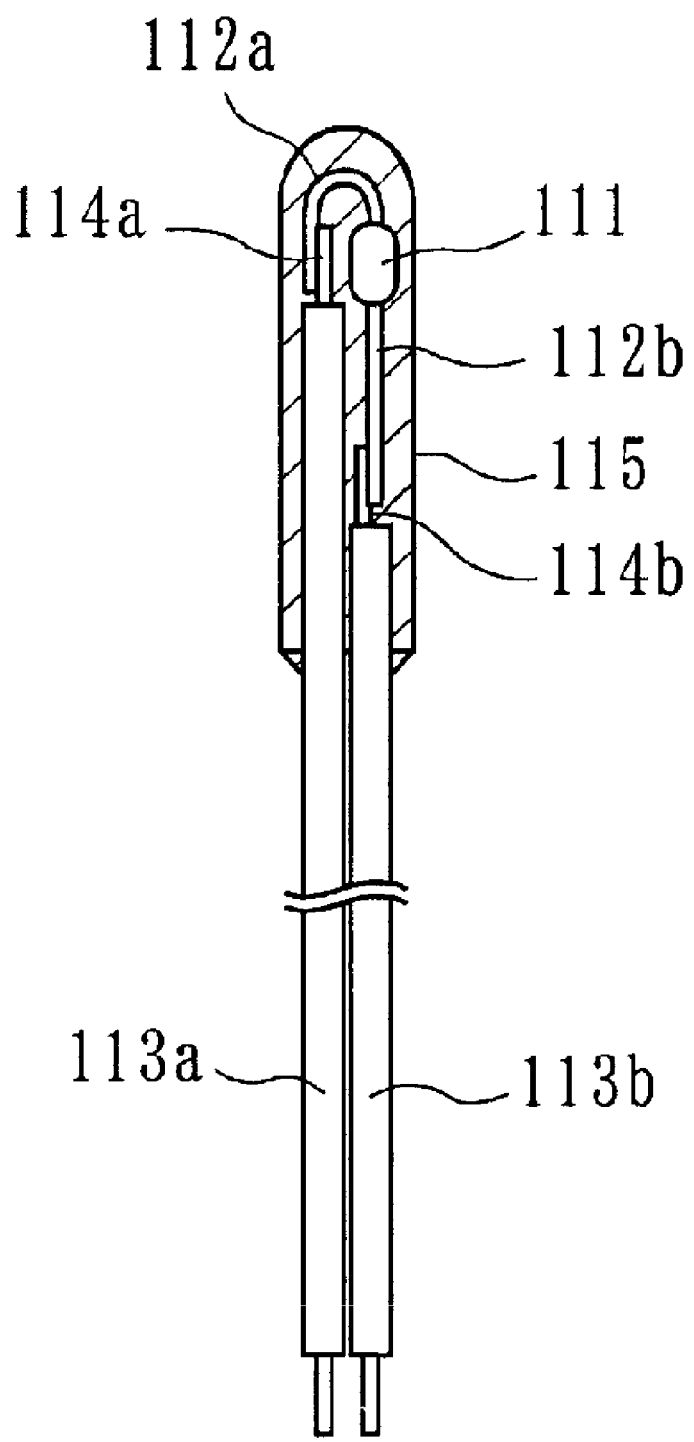
FIG. 22 is a cross-sectional view of a temperature sensor with leads described in Japanese Unexamined Patent Application Publication No. 11-108771.

FIGS. 19 and 20 illustrate examples in which a thermistor with leads is applied for temperature detection in a fuel cell.

In the fuel cell, three battery cells 36a, 36b, and 36c are preferably arranged in parallel inside a battery casing 35, and a control board 37 is arranged at the end of the battery casing 35, for example.

In measuring the temperature of the battery cell 36b, because the leads are mounted on the control board 37, the measurement point and the control board 37 are unavoidably remote.

In such a case, as illustrated in FIG. 19, the use and mounting of the thermistor 9' with leads enables the temperature of the battery cell 36b to be detected easily with high sensitivity.

To measure temperatures of all of the three battery cells 36a, 36b, and 36c, as illustrated in FIG. 20, the use and mounting of the thermistor 8" with leads enables the temperatures of all of the battery cells 36a, 36b, and 36c to be detected easily with high sensitivity.

Additionally, a temperature sensing portion of a thermistor can be arranged at a heating point of a field-effect transistor (FET) used in a power source. The FET at anomalous heating conditions can be controlled quickly and accurately.

Multiple FETs and large batteries are mounted in an electronic device, such as a personal computer. Also in this case, the use of a structure in which multiple thermistors are connected, as illustrated in FIG. 20, enables the temperature to be measured efficiently.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A temperature sensor with leads comprising:
a temperature sensor including a sensor body and first and second leads each including a metal line, the temperature sensor including first and second terminal electrodes disposed at both ends of the sensor body, the metal line being covered with an insulating member, the first and second leads being electrically connected to the first and second terminal electrodes, respectively; wherein
the metal line of each of the first and second leads is surface-exposed;
at least the first lead includes a tip having a shape that is cut such that the tip and a side folding portion of the first terminal electrode connected to the first lead form a predetermined angle;
the first lead is connected to the first terminal electrode through solder, and the second lead is connected to the second terminal electrode through solder;
the first lead is longer than the second lead;
the first terminal electrode and the first lead are connected to each other through the solder such that the sensor body is attached to the first lead along a longitudinal direction of the sensor body; and
the tip of the first lead has any one of an inclined shape, a curved shape, an L shape, a stepped shape, an acute shape, and any combination thereof.

2. The temperature sensor with leads according to claim 1, wherein the first lead and the second lead are connected integrally along a longitudinal direction and define a parallel lead set.

3. The temperature sensor with leads according to claim 1, wherein the second lead includes a tip having a shape that is cut such that the tip and an end surface portion of the second terminal electrode form a predetermined angle.

4. The temperature sensor with leads according to claim 3, wherein the tip of the second lead has any one of an inclined shape, a curved shape, an L shape, a stepped shape, an acute shape, and any combination thereof.

5. The temperature sensor with leads according to claim 1, wherein the temperature sensor is a surface-mount thermistor.

6. The temperature sensor with leads according to claim 5, wherein the surface-mount thermistor includes an internal electrode.

7. The temperature sensor with leads according to claim 5, wherein the surface-mount thermistor includes a surface covered with a glass layer.

8. A temperature sensor with leads comprising:
a temperature sensor including a sensor body and first and second leads each including a metal line, the temperature sensor including first and second terminal electrodes disposed at both ends of the sensor body, the metal line being covered with an insulating member, the first and second leads being electrically connected to the first and second terminal electrodes, respectively; wherein the metal line of each of the first and second leads is surface-exposed;

at least the first lead includes a tip having a shape that is cut such that the tip and a side folding portion of the first terminal electrode connected to the first lead form a predetermined angle;

the first lead is connected to the first terminal electrode through solder, and the second lead is connected to the second terminal electrode through solder;

the first lead and the second lead have different lengths; and the second lead includes a tip having a shape that is cut such that the tip and a side folding portion of the second terminal electrode form a predetermined angle.

* * * * *